United States Patent [19]
Toops

[11] Patent Number: 5,206,503
[45] Date of Patent: Apr. 27, 1993

[54] X-Y TRANSLATIONAL IMAGING DEVICE WITH HOUSING SUPPORTING MEANS FOR A CAMERA BODY INCLUDING IMAGE SENSING MEANS

[75] Inventor: Laurence C. Toops, Newbury Park, Calif.

[73] Assignee: Northrop Corporation, Hawthorne, Calif.

[21] Appl. No.: 741,385

[22] Filed: Aug. 7, 1991

[51] Int. Cl.[5] ............................................. H01J 3/14
[52] U.S. Cl. ................................ 250/234; 250/227.20; 358/213.24
[58] Field of Search .................... 250/234, 227.20; 356/152, 376, 400; 33/1 M; 358/108, 101, 107, 51, 213.24, 10, 222; 901/47

[56] References Cited

U.S. PATENT DOCUMENTS

| | | | |
|---|---|---|---|
| 4,024,392 | 5/1977 | Teppo et al. | 250/216 |
| 4,034,208 | 7/1977 | Vaeth et al. | 235/61.5 |
| 4,593,309 | 6/1986 | Uno et al. | 358/10 |
| 4,717,958 | 1/1988 | Gal et al. | 358/222 |
| 4,886,330 | 12/1989 | Linick | 350/6.5 |

FOREIGN PATENT DOCUMENTS

| | | |
|---|---|---|
| 210530A | 7/1989 | United Kingdom . |
| 215941A | 9/1989 | United Kingdom . |

Primary Examiner—David C. Nelms
Assistant Examiner—T. Davenport
Attorney, Agent, or Firm—Terry J. Anderson; Robert B. Block; Karl J. Hoch, Jr.

[57] ABSTRACT

An imaging device has a lens for focusing light and a sensor for imaging that light. The lens is selected such that the focus coverage area projected from the lens is much greater in area than the area of the sensor. The sensor is moved through the coverage area of the lens linearly along mutually perpendicular axes that are also perpendicular to the axis of the lens allowing the field of view of the lens to be systemically scanned by the sensor utilizing only linear translational motion of the sensor.

15 Claims, 3 Drawing Sheets

X-Y TRANSLATIONAL IMAGING DEVICE WITH HOUSING SUPPORTING MEANS FOR A CAMERA BODY INCLUDING IMAGE SENSING MEANS

BACKGROUND OF INVENTION

This invention is directed to imaging devices that use a lens in combination with a sensor. The sensor is moved utilizing X-Y linear translational motion through the imaging area of the lens.

Various imaging systems are known for scanning fields of view and fields of regard. A particularly useful imaging system is one that scans then locks on targets in various weapon delivery systems and/or guided projectiles. Such imaging systems generally scan in either the visible or the infrared spectral region. Useful as sensors or pick up devices in these systems are television tubes and linear or matrix array devices such as charge coupled devices and infrared detectors including infrared focal plane arrays.

Since infrared focal plane arrays or charge coupled TV camera imaging devices typically have very limited fields of view it is necessary to mount such devices on housings which are movable in order to utilize such devices in scanning, searching or target tracking over a larger viewing area, called the field of regard. One method to increase the field of regard of these devices is to mount both the device and any associated optics for conveying images to the device in a gimbal mount. One such gimbal mount is shown and described in U.S. Pat. No. 4,024,392, entitled Gimballed Active Optical System. This patent describes a device which includes a refractor having a sensor fixedly mounted to the refractor the totality of which is suspended in a two axis gimbal. Movement about the two axes of the gimbal allows for scanning and other dynamic motions necessary to increase the field of regard of the device. U.S. Pat. No. 4,034,208, entitled Acceleration Aided Tracking Of A Designated Target, provides for computer aided tracking utilizing a gimballed sensor device. In this device a three action gimbal motion is described allowing for rotation of the sensor about roll, azimuth and elevational axes.

Because the optics and the sensor all must be gimballed together to move as a unit, the gimbal devices described above are inherently complex. If cryogenic cooling is necessary for the operation of infrared devices, this adds additional components that must be incorporated on the gimbal mount and moved for scanning, tracking or the like. In order to simplify such devices U.S. Pat. No. 4,886,330 describes an infrared imaging system that utilizes a mirror that is rotated for tracking the target about the azimuth axis and is tilted for tracking the target about the elevational axis. An inherent problem with this design is that the image will flip as the mirror is rotated in azimuth.

For both azimuth-elevational moved mirrors and gimbal mounted devices, a protective dome is needed to shield the components from the air stream they move through. Since such domes must not distort the optics of the system, the domes must themselves be of optical quality. Further, especially in a gimbal mounted system, the dome must be sufficiently large to cover the totality of the movement of the gimbal. This requires the dome to be spherical, parabolic or of other exotic shape. Inherently, such domes are expensive components. Additionally, inherently such domes do not lead to "low observability" or stealth characteristics. Furthermore, the imaging optics must be custom designed to correct for the refractive power of these domes.

BRIEF DESCRIPTION OF THE INVENTION

It is a broad object of this invention to provide search, scan and/or tracking optical systems that are inherently simple in construction and operation and can use common optical lenses within their imaging systems.

In accordance with these and other objects of this invention, as will be apparent from the remainder of this specification, an imaging device is provided that includes a lens means for sensing and focusing electromagnetic radiation. The lens means focuses radiation from objects in the field of view of the lens means to an imaging area of the lens means. A radiation sensor means for detecting electro-magnetic radiation is positioned in the imaging area of the lens means. The radiation sensing means has a sensing area that is much smaller than the imaging area of the lens means. A means for moving the sensor via X-Y translational motion within the imaging area moves the sensor means throughout the imaging area of the lens means.

Further in accordance with the objects of the invention the invention is directed to an imaging device having an objective for focusing light and a sensor for imaging that light. The objective is selected such that the focus coverage area projected from the objective is much greater in area than the area of the sensor. The sensor is moved through the coverage area of the objective linearly along mutually perpendicular axes that are also perpendicular to the axis of the objective. By selecting a lens as the objective, that has coverage substantially wider than that of the sensor, the field of view of the lens can be systematically scanned by the sensor utilizing only linear translational motion.

In preferred embodiments of the invention the lens means or objective is selected such that the imaging area or focus coverage area lies in an image plane preferably a focal plane. The radiation sensor means is preferably selected to sense electromagnetic radiation selected from the group consisting of visible, ultraviolet, near infrared, mid infrared, far infrared or millimeter wave radiation with the visible and near infrared bands being particularly preferred radiation bands to be sensed. In a preferred embodiment of the invention the lens means can comprise an optical lens selected from the group of lens consisting of wide angle design lens, extra wide angle design lens, normal design lens and telephoto design lens.

The means for moving said sensor means preferably includes a first axis translational moving means and a second axis translational moving means each independently operatively connected to the sensor means for moving the sensor means. The first axis translational moving means linearly moves the sensor means along a first axis and the second axis translational moving means linearly moves the sensor means along a second axis that is perpendicular to the first axis. In other embodiments of the invention the imaging device further includes a third axis moving means for moving the sensor means linearly along a third axis wherein the third axis is mutually perpendicular to the first and second axes.

In preferred embodiments of the invention the sensor means includes at least one of a visible or infrared focal plane array detector, preferably a linear array detector or a matrix array detector.

The first axis translational moving means preferably includes a first axis shuttle, a first axis drive motor and a first axis shuttle guide. The first axis shuttle guide is fixed with respect to the lens with the first axis shuttle movably mounted on the first axis shuttle guide and moved on that guide by the first axis drive means. The second axis shuttle guide is operatively attached to and moved by the first axis shuttle along the first axis. The second axis shuttle is movably mounted to the first axis shuttle guide and moved thereon by the second axis drive motor. A sensor means operatively attaches to and is moved by the second axis shuttle.

Further in accordance with the objects of the invention, the invention further includes a method of sensing images. This method includes selecting a lens capable of focusing light to a focal plane. It further includes selecting a sensor means for detecting that light. The sensor is selected to have a sensing area that is smaller than the coverage area of the lens in the focal plane of the lens. An X-Y translational motion moving means is also selected. This moving means includes a mounting surface. The moving means is for independently linearly moving the mounting surface translationally in both a first direction and second direction that are mutually perpendicular to each other and are mutually perpendicular to the axis of the lens. The sensor means is mounted on the X-Y translational motion means mounting surface. The X-Y translational motion moving means is positioned in a spatial relationship with respect to the lens such that the sensor means on the mounting surface is located in the focal plane of the lens and moves translationally in the focal plane in response to X and Y translational motion of the translational motion moving means. The translational motion moving means is operated to linearly move the sensor means throughout the lens focal plane to sense images within the field of view of the lens.

Further, in accordance with the objects of the invention the invention includes a method of tracking an object that is moving with respect to a housing. This method includes locating a lens on the housing and further locating an X-Y translational motion means on the housing in association with the focal plane of the lens. A sensor means is located on the X-Y translational means to move in the focal plane of the lens along mutually perpendicular axes that are also mutually perpendicular to the axis of the lens. The X-Y translational motion means is operated to move the sensor means linearly throughout the coverage areas of the lens to initially sense the presence of an object within the field of view of the lens and after the presence of such an object is sensed, the X-Y translational motion means is operated to maintain the image of the object on the sensor means in response to movement of the and the object with respect to one another.

BRIEF DESCRIPTION OF THE DRAWINGS

This invention will be better understood when taken in conjunction with the drawings wherein:

FIG. 5 and FIG. 6 are elevational views of certain of the components of FIG. 4.

DETAILED DESCRIPTION OF THE INVENTION

In order to facilitate understanding of this invention the following definitions will be used in this specification.

Field of view is understood to mean the maximum angle of view that can be seen through a lens. As utilized to describe this invention, the field of view is also the field of regard.

An imaging plane is a plane perpendicular to the axis of the lens through which an image is formed. A real image formed by a positive lens would be visible upon a screen located in this plane.

A focal plane is a imaging plane that is at right angles to the principal axis of the lens and also includes a focal point of the lens. Generally at the focal plane the best image is formed.

Coverage or coverage area are the total image circle projected by a lens or other objective. For a circular lens it is the theoretical circular image made up of light that has been refracted by the lens.

Figure 1:
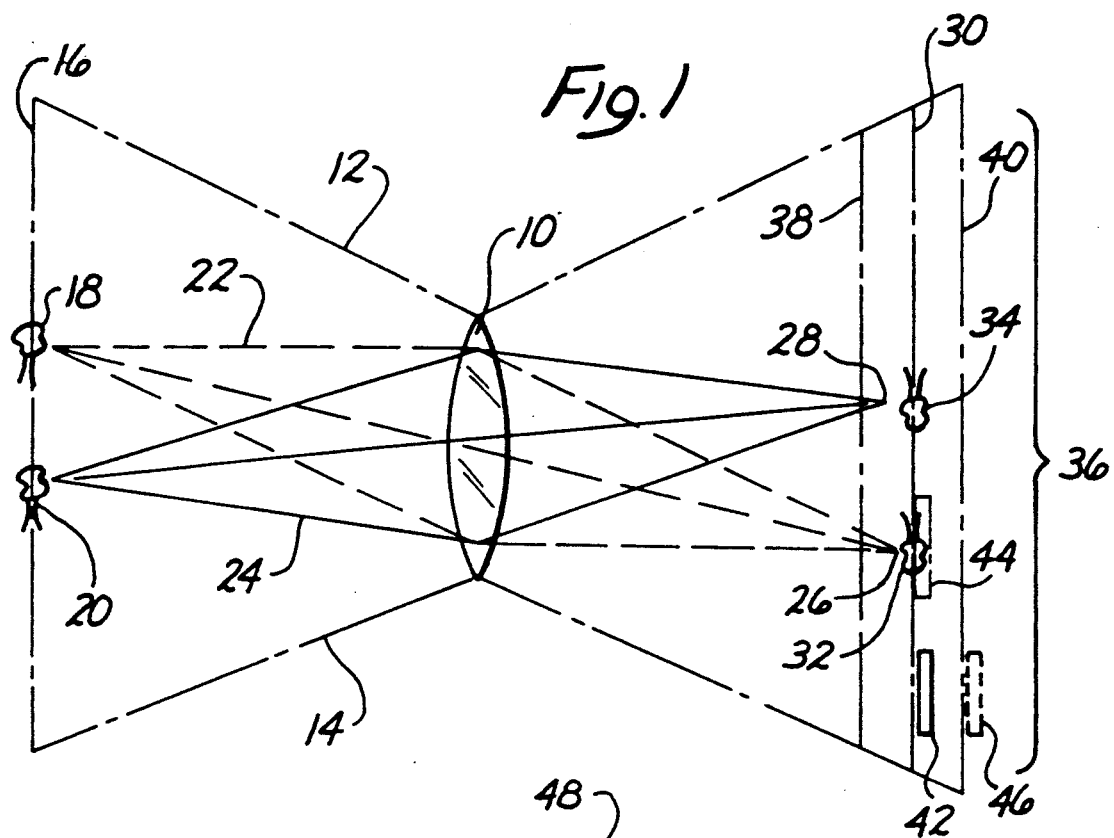
FIG. 1 is a representational view of objects in space, a lens and images of the objects focused by the lens to a focal plane and other imaging planes.

FIG. 1 diagrammatically illustrates these definitions. In FIG. 1, a lens 10 is schematically illustrated. Lines 12 and 14 define the angle of the field of view of the lens 10. The area of coverage at a given distance from the lens (the object focal plane) is depicted by line 16. Two objects 18 and 20 within the field of view of the lens 10 are shown displaced at a distance from the lens 10. Radiation depicted by the pencil of lines 22 from object 18 and the pencil of lines 24 from object 20 either emitted from or reflected from the objects 18 and 20 are refracted by the lens 10 to the right of the lens 10. The radiation refracted by the lens 10 comes to focal points 26 and 28 respectively that lie in a focal plane 30. Real images 32 and 34 of objects 18 and 20 can be seen in the focal plane 30.

The coverage or coverage area of the lens 10 at the focal plane would be that area delineated by the bracket 36. Any object lying on the object plane line 16 would be focused by the lens 10 to the focal plane 30 within the coverage area 36. The focal plane 30 represents an image plane. Within the focal plane 30 the cross sections of the pencils of rays forming the image are at a minimum. These minimum cross sections are known as the "circles of least confusion," and will result in the best image.

Other imaging planes in front of or in back of the focal plane also exist. Imaging plane 38 lies in front of the focal plane 30 while imaging plane 40 lies behind it. In either of the image planes 38 or 40 the circles of confusion will not be at a minimum and the image of the objects 18 and 20 will be out of focus. However, depending upon the resolution needed for the imaging devices of the invention, the images of the objects 18 and 20 may be scanned in imaging planes other than the focal plane as, for instance, imaging planes 38 or 40. Further, if, for instance, the lens 10 is an optical glass lens that corrects for aberrations for visible light but not for aberrations of say near infrared light, an infrared object emitting radiation in the near infrared may be in its sharpest focus on a far imaging plane as, for instance, imaging plane 40 while visible images would be in sharpest focus on the visible focal plane 30. In such instance a first sensor of the invention could be positioned on the imaging plane 30, the visible focal plane, while a second sensor of the invention may be positioned on imaging plane 40, the near infrared imaging plane.

Further shown in FIG. 1, is a sensor shown at position 42. At position 42 the sensor is located in the focal plane 30. The sensor is capable of moving along the focal plane 30 within the coverage area 36. In FIG. 1 movement along the axis towards and away from the viewer is ignored and only motion along a vertical axis or the horizontal axis is considered. In devices of the invention, the sensor would also be capable of movement in the focal plane 30 in the axis towards and away from the viewer. At the position shown by the numeral 42 in solid line, neither of the images 32 and 34 of the objects 18 and 20 are sensed by the sensor 42, however, if the sensor 42 is moved to the position indicated by phantom line 44, the image 32 of the object 18 would be sensed by the sensor. Movement of the sensor from position 42 via translational motion within the focal plane 30 would position the sensor at the position shown by line 44. Instead, if the sensor was moved from the position 42 to the position shown by phantom line 46 by moving the sensor away from the lens 10 parallel with the axis of the lens 10, the sensor 46 would be positioned in a different imaging plane as, for instance, in an imaging plane that might be in the focal plane for near infrared radiation.

Figure 2:
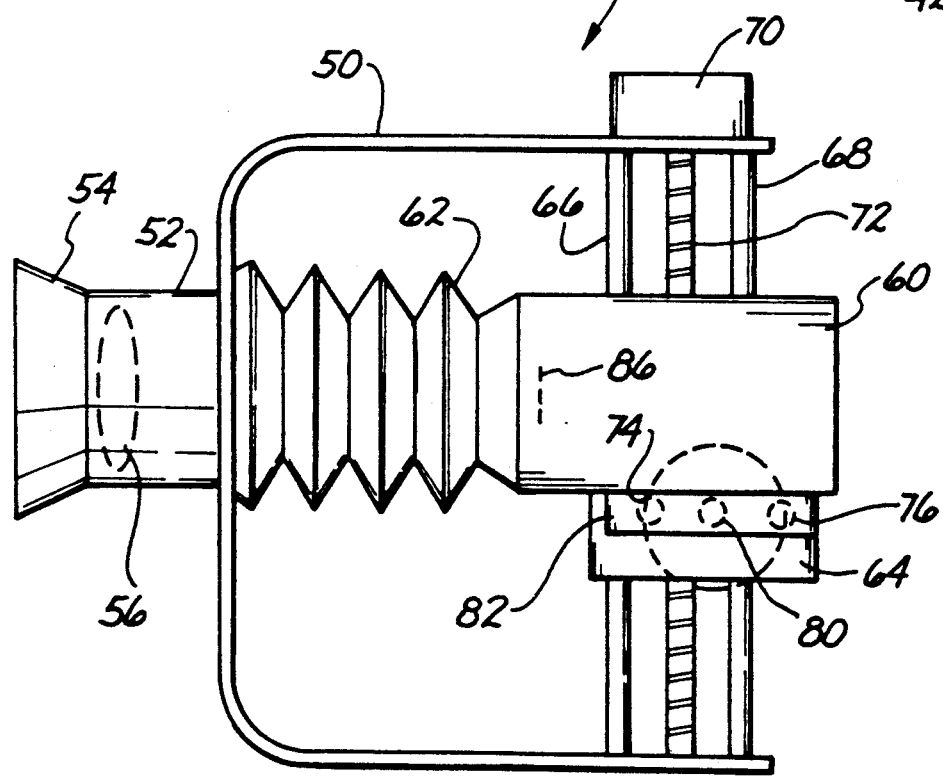
FIG. 2 is a side elevational view of an imaging device of the invention.
Figure 3:
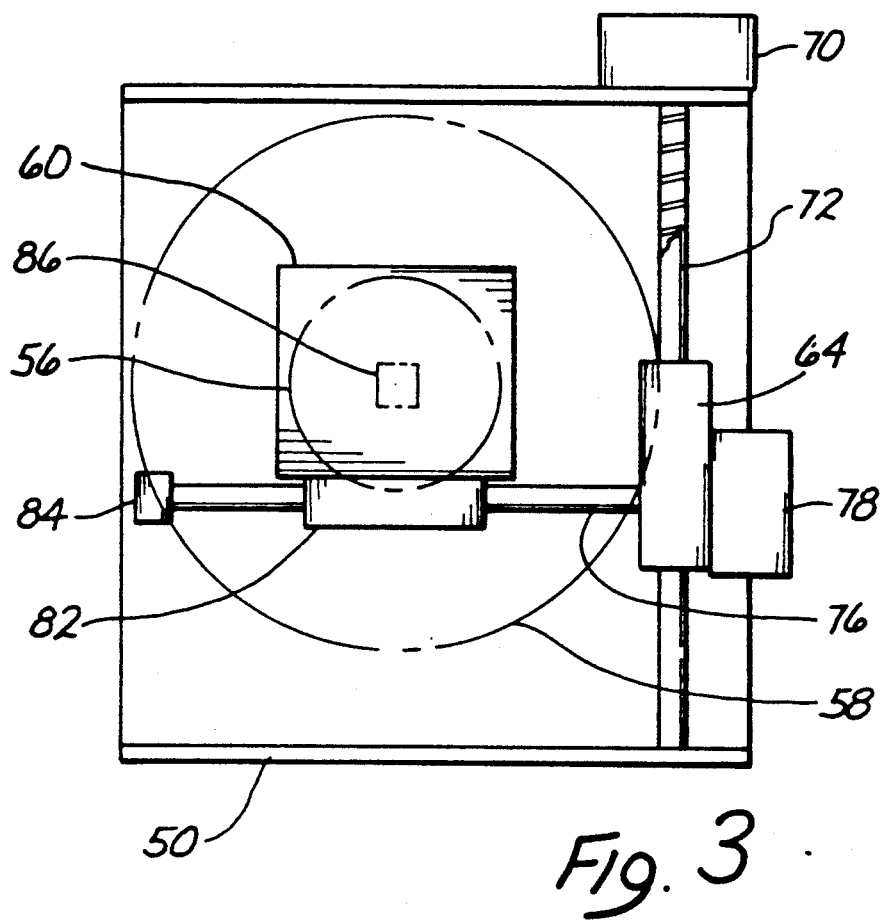
FIG. 3 is a rear elevational view of imaging device of FIG. 2.

FIGS. 2 and 3 show a first embodiment of an imaging device of the invention. The imaging device 48 of these figures includes a housing 50 that supports other components. Attaching to the housing 50 is a lens holding tube 52. Lens holding tube 52 includes a lens hood 54 on the end thereof. Located within the lens holding tube 52 is a lens 56. The lens 56 can be chosen as a wide angle lens (a lens having a wide field of view and large coverage area). Lens of extra wide angle design, normal design and telephoto design also are useful in the invention.

Referring to FIG. 3, the lens 56 would be able to focus radiation from objects within its field of view to a coverage area depicted by the line 58. Referring back to FIG. 2, further incorporated as a part of the imaging device 48 is a TV camera 60. Connecting the TV camera 60 with the lens holding tube 52 is bellows 62. The bellows 62 is for attenuating any reflected or stray light within the interior of the housing 50. Means other than a bellows also can be employed to keep extraneous light from reaching the sensor. Such means include rendering the interior of the housing 50 light tight and non-reflective.

The camera 60 is supported on an X-Y translational mount that is capable of raising the camera 60 vertically either as seen in FIGS. 2 or 3 or moving the camera horizontally to the left and right as seen in FIG. 3. Such horizontal movement would be toward or away from the plane of the paper as seen in FIG. 2.

There is no requirement that the device 48 be positioned to view object horizontally as seen in FIGS. 2 and 3, it, in fact, could be positioned to look up, down, at an angle or any other direction. As such, in speaking of X-Y translational movement, this invention is not limited to just horizontal or vertical coordinates. For this invention, X-Y translational movement is meant to include any movement in a first direction and a second direction where the first and second directions are mutually perpendicular to each other. For the illustrated device 48, the X-Y translational movement axes are also mutually perpendicular to the axis of the lens. As viewed in FIG. 2 the axis of the lens 56 would extend from the left to the right from the lens 56 to the camera 60.

A first axis (or as viewed in the figures a vertical or Y coordinate axis) shuttle 64 is slidable mounted on first axis guide rods 66 and 68. A first axis drive motor 70 is fixed to the housing 50. A lead screw 72 is rotated by the motor 70. The lead screw 72 threads through the shuttle 64. Rotation of the lead screw 72 raises or lowers shuttle 64 toward or away from the motor 70. Thus, in response to rotation or activation of the motor 70 the lead screw 72 rotates and in doing so moves the shuttle 64 along the guide rods 66 and 68.

Second axis guide rods 74 and 76 are fixed to the first axis shuttle 64 so as to move in conjunction with movement of the shuttle 64. A second axis motor 78 is also fixed to the shuttle 64. A lead screw 80 is attached to the motor 78 and is rotated by the motor 78. A second axis shuttle 82 slides along the second axis guide rods 74 and 76. The second axis lead screw 80 is threaded through the second axis shuttle to move the second axis shuttle 82 toward and away from the first axis shuttle 64 in response to rotation of the motor 78.

A collar 84 on the ends of the guide rods 74 and 76 prevents the second axis shuttle 82 from moving off of the left hand end of the guide rods 74 and 76 as seen in FIG. 3. The presence of the shuttle 64 serves to prevent movement of the shuttle 82 off of the right hand end of these guide rods. In a like manner, the housing 50 prevents movement of the shuttle 64 off of the respective ends of the guide rods 66 and 68.

The camera 60 is mounted on the second axis shuttle 82 and therefore moves in response to movement of the second axis shuttle 82. Located in the interior of the camera 60 is a charge coupled device (a CCD) sensor 86. The sensor 86 has a small imaging plane compared to the imaging plane of the lens 56. As, for instance, the lens 56 may be a lens having a field of coverage of about 91 millimeters in diameter whereas the size of the CCD sensor 86 in the camera 60 might only be 4.5×6 millimeters. Such a sensor would have a diagonal of about 8.8 millimeters that is approximately 10 fold less than the diameter of the coverage area 58 of the lens 56.

If the sensor 56 were fixed in space with respect to movement perpendicular to the axis of the lens 56, the amount of coverage of the field of view of the lens 56 would be extremely narrow. However, by virtue of the movable shuttles 64 and 82, the camera 60 can be moved translationally or linearly along axes that are mutually perpendicular to the axis of the lens 56 to reposition the sensors 86 within the coverage area 58 of the lens 56. By choosing the lens 56 as a "wide angle" lens, its field of view can be quite broad. The breadth of that field is dependent upon the amount of distortion that can be tolerated in the images sensed. If extreme distortion can be tolerated the lens 56 can be chosen as an extremely wide angle lens as, for instance, a fish eye lens. Angles of view approaching 180° are possible with such fish eye lenses. Normally that extreme angle of view is not necessary and an angle view of about 90° is sufficient to render a fairly large imaging field for the device 48. In any event a large imaging field can be created by using essentially "off the shelf" commercial lenses for the lens 56. The devices of the invention also have useful application with other coverage lens, such as with a telephoto lens for long range surveillance.

In utilizing the terminology "lens" for the lens 56 it is understood that said "lens" could be a compound lens made up of many different optical elements incorporated therein to correct for different aberrations. Neither the lens 56, nor the housing 50, however, need be moved in order to sense objects through a wide sensor field of regard, i.e. throughout the field of view of the lens. The camera 60 and its sensor 86 is simply moved via linear motion throughout the coverage area 58 of lens 56 to scan an extremely wide field of regard of objects of interest.

In one use of the device 48 of the invention, in those situations where people might be very cognizant of having a camera panned toward them as, for instance, during a conference or the like, the device 48 can be positioned in a corner of a room and remain stationary with only the camera 60 moving within the housing 58 to pan throughout the field of view of the device 48. However, since the camera 60 is hidden out of sight within the housing 50, such panning by the camera would not be apparent to those sitting in the field of view of the device 48 and therefore camera panning would not inhibit the full participation of those present in the field of view of the device 48.

As opposed to prior known devices as, for instance, in missiles and the like, which utilize gimballed mounts or pan and tilt mounts, the device 48 need only present a profile the size of the lens 56. Since the lens 56 is an optical element that does not need a protective dome, it has an extremely low profile and is subject to use in low observable or stealth vehicles. While a typical flat filter element might be utilized in front of the lens 56 to shield the lens 56 from debris or the like, no special optical covers are needed for the lens 56. This is opposed to gimbal mounts or the like wherein special optically ground domes must be utilized to shield the sensor device and its gimballed mount.

The lens 56 can be a fixed focus lens or it could be a zoom lens that is under the control of other components as, for instance, a computer. Standard commercial lenses can therefore be utilized for the lens 56. By choosing a sufficiently wide angle lens 56, a large "field of regard" can be traversed utilizing only simple linear motion imparted to the camera 56 by the shuttles 64 and 82. In air vehicles as, for instance, missiles and the like, normally a large "field of regard" can only be obtained through gimballed motion of a total apparatus as, for instance, that described in the above referenced U.S. Pat. No. 4,024,392. In the airborne gimballed apparatus a servo loop is often closed around such axis to stabilize the sensor image. The X-Y translation devices of this invention can be stabilized in a similar manner if desired.

Commercial components are also available for use as the shuttles, guide rods, lead screws an the motors incorporated in the devices of the invention. As, for instance, translators are commercially available from Ardel Kinamatic, a division of Oriel Corporation. These translators include a suitable motor, guide rods, drive screw and the like for moving a shuttle. Such translators can be configured in X-Y configurations or even X-Y-Z configurations if desired. Computer control of these translators is also commercially available. Another source of such translators are similar components known as "Daedal Positioning Systems and Controls" available from Parker Corporation. Further suitable devices include Nanomover TM translators available from Melles Griot.

While only first and second axis X-Y type translation is shown in FIGS. 2 and 3, if desired a further translator could be added to provide movement of the camera 60 along the third or Z axis toward and away from the lens 56. Such movement might be desirable if dual sensing units were utilized in the camera as, for instance, one for a visual focal plane and one for a infrared focal plane as described for sensor positions 42 and 44 in FIG. 1 or if Z axis movement was desired to correct for spherical aberration at the fringes of a very large lens. If a Z axis translator was utilized to add an additional axis of motion to the device 48, it would be appropriately "piggy backed" onto the shuttle system in the same manner as described for the first and second axis translators of FIGS. 2 and 3. For a fixed system as, for instance, a visual imaging system, such Z axis motion would not normally be necessary. Complete scanning of the coverage area of the lens 56 is suitably achieved only utilizing the first and second axis components, i.e. the X-Y motion as described for FIGS. 2 and 3.

Figure 4:
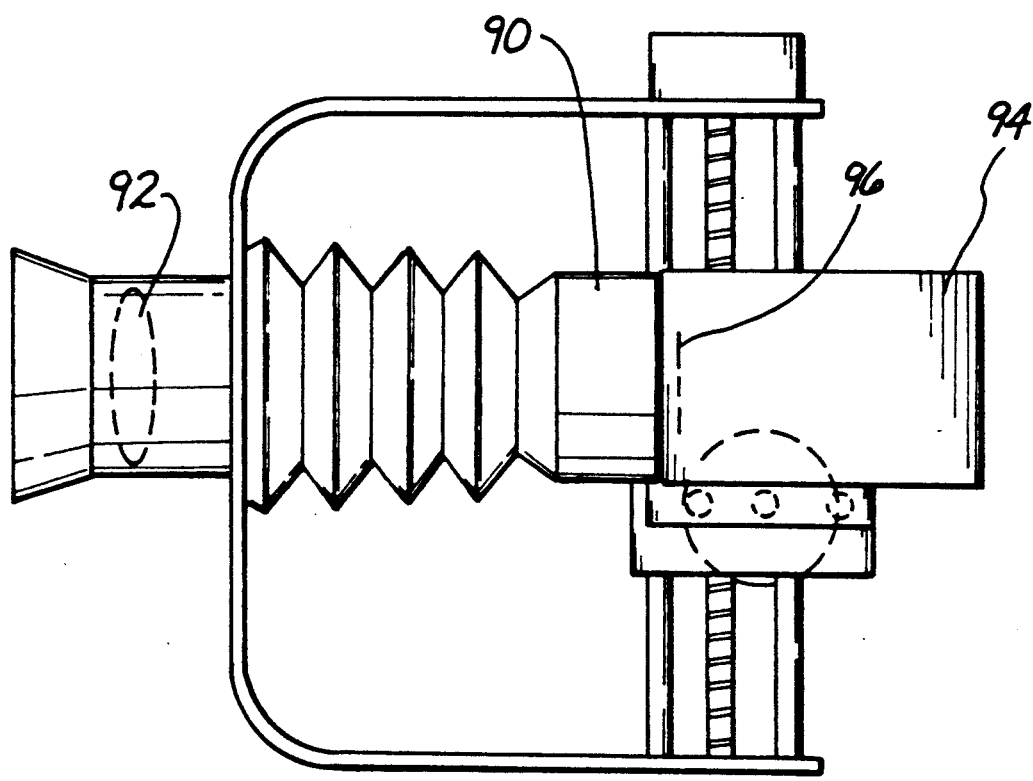
FIG. 4 is a side elevational view of a further imaging device of the invention.

Other embodiments of the invention are shown in FIGS. 4 and 6. In FIG. 4, like numerals are used to identify like parts illustrated in FIGS. 2 and 3; however, for comparison purposes between figures certain components are given unique numbers in FIG. 4 compared to FIGS. 2 and 3. Further, in all of the figures, the double convex physical shape of the lenses illustrated in the figures is representational only and is not to be construed as being indicative of the actual physical shape of the appropriate lens elements necessary to achieve the desired optics.

In the embodiment of the invention illustrated in FIGS. 4 and 6, an intensifier 90 is positioned behind a lens 92 in a fixed relationship with a camera 94 having a sensor 96. The sensor 96 is positioned in a camera 94 in a manner similar to that described for the sensor 86 and camera 60 of FIG. 2. The lens 92 functions the same as lens 56 of FIG. 2. The intensifier 90 is positioned behind the lens 92—between it and the camera 94 and its sensor 96.

Figure 5:
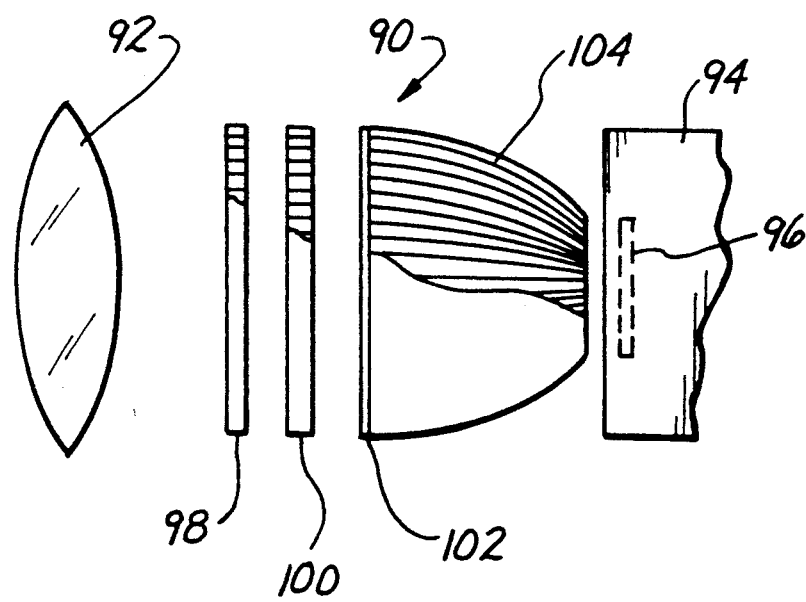

The lens 92 and the intensifier 90 are further illustrated in FIG. 5 and FIG. 6. In this figure the component parts of the intensifier 90 are shown. The intensifier 90 includes a photocathode 98, microchannel plate 100 (a solid state photon amplifier available as, for instance, from ITT or Varo Electro-Optics), a phosphor screen anode 102 and a fiber optic bundle 104. If desired, a lens (neither shown nor separately numbered or identified) could be used in place of the fiber optic bundle 104 to focus light from the phosphor screen anode 102 to the sensor 96 of the camera 94. Light striking the photocathode 98 results in emission of electrons towards the microchannel plate 100. The microchannel plate 100 amplifies this electronic signal. The amplified electrons striking the phosphor screen anode 102 excite the phosphors and they emit photons of light towards the fiber optic bundle 104 (or an equivalent lens). Photons emitted by the screen 102 are then channeled by the fiber optic bundle to the camera 94 and its sensor 96.

The effect of the intensifier 90 is to amplify the light signal. Thus the embodiment of FIG. 4 would be especially useful in "low light" situations wherein the intensifier 90 serves to electronically enhance the light level of the ambient environment being scanned by the lens 92. The lens 92 of FIG. 4 is equivalent to the lens 56 of the embodiment of FIG. 2. The photocathode 98 is positioned in the focal plane of the lens 92. Together the components of the intensifier 90 and the camera 94 move in unison in an X-Y type translational manner throughout the coverage area of the lens 92. The remainder of the components of FIG. 4 serve as an X-Y translational movement means to move the intensifier 90 and the camera 94 in the same manner illustrated and described for the camera 60 of FIGS. 2 and 3 to scan the coverage area of the lens 92 as intensified by the component parts of the intensifier 90. The intensifier 90 and its component parts and the camera 94 and its sensor 96 are thus equivalent to the camera 60 and sensor 86 of FIGS. 2 and 3 in that they scan through a coverage area of a lens.

By combining the intensifier 90 with an appropriate image storage/refresh buffer (neither shown nor separately numbered or identified), some of the inherent loss in image resolution due to the intensifier's construction can be recovered by moving the camera 94 and the intensifier 90 together a distance equal to one half the pitch between adjacent microchannels of the microchannel plate 100 in both a plus/minus X and a plus/minus Y direction. Such movement can be accomplished via the X-Y translational movement means of the invention.

In reference to all of the embodiments of the various figures, because of the X-Y translational or linear motion achieved via the shuttles 64 and 82 and the components attached thereto that move the shuttles, the various sensing means such as the charge coupled device 86 of camera 60 of FIG. 3 and the charge coupled device 96 of the camera 94 in conjunction with the intensifier 90 of FIG. 4, are able to move through a large sensing area.

Referring back to FIG. 3, the sensor 86 can move throughout a large sensing area equal in size to the coverage area 58 of the lens 56. Even though physically the surface area of the sensor 86 is much smaller than the coverage area 58 of the lens 56, the sensor can effectively detect images within the totality of the lens coverage area. Typically the area of coverage 58 of the lens 56 would be at least six times the surface area of the sensor 86, with even more preferred ranges being much greater than that as, for instance, a greater than a 10 to 1 ratio that is achieved utilizing the above described coupling of a lens having an area of coverage diameter of 91 millimeter with a 4.5×6.8 millimeter sized sensor.

A very small sensor can be made to traverse across the imaging area of the lens utilizing X-Y translational motion imparted thereto by X-Y translational means corresponding to the shuttles, guide rods, lead screws and motors as illustrated in the figures. The sensor is moved along axes that are mutually perpendicular to each other and mutually perpendicular to the axis of the lens element. Illustrative of this is movement of the sensor 86 of FIG. 3 with respect to the lens 56.

The devices of the invention can therefore be utilized to sense images by simply selecting a lens or other lens means that focuses light to a focus plane, selecting a sensor that can detect that light, mounting that sensor on an X-Y translational motion mechanism to move the sensor along directions that are mutually perpendicular to the axis of the lens and systematically positioning the sensor via X-Y translational motion throughout the objective focal plane of the lens to sense images within the field of view of the lens. In a like manner, objects can be tracked by first sensing the object as above and once the object is located, maintaining the image of the object on the sensor by operating the X-Y translational motion mechanism to keep the image of the object located on the sensor.

The devices of the invention are suitable for appropriate software control for initially recognizing images and maintaining those images nearly stationary in a sensing area. Motion of the X-Y translational mechanism to maintain an image on the sensor can be imparted to suitable microprocessor control to control a tracking device as, for instance, a missile or the like having a device of the invention mounted thereon.

Suitable for sensors of the devices of the invention are various sensors including focal plane array sensors as, for instance, infrared imaging devices or charge coupled devices including linear array devices and matrix array devices.

By selecting an appropriate sensor, devices of the invention are suitable for detecting visible, near infrared, ultra violet, mid infrared, far infrared or millimeter wave radiation. Most preferred are sensors for visible and near infrared radiation Other useful bands, however, are the 3 to 5 and 8 to 12 micrometer infrared radiation bands. Other sensors are known that go out as far as to the millimeter wave length radiation or as short as ultraviolet radiation.

This invention may be embodied in other specific forms without departing from the spirit and essential characteristics thereof. The present embodiments are therefore to be considered in all respects as illustrated and not restrictive, the scope of the invention being indicated by the appended claims rather than by the forgoing description and all changes that come within the meaning and range of equivalencies of the claims are therefore intended to be embraced therein.

I claim:

1. A camera having an angularly adjustable field of view while maintaining a lens and outer support housing stationary comprising:
   a lens mounted to said housing and having an axis and a focal length such that parallel light rays from object space entering said lens are focused on a plane in image space;
   the rays from separated objects in object space defining angularly separate bundles so that spaced objects in the object space become angularly spaced bundles and spaced images in image space;
   a camera body including image sensor means; and
   means carried on said housing for supporting said camera body and sensor means in image space and for moving said camera body and sensor in X-Y translational movement about image space so that said translation movement of the sensor camera body are alone causes the sensor to shift its angular field of view in object space.

2. An imaging device of claim 1 including:
   said lens means being capable of focusing said radiation to a focal plane, said focal plane being congruent with said image plane; and
   said sensor means being located at the focal plane of said lens means.

3. An imaging device of claim 1 wherein: said radiation sensor means is selected to sense electromagnetic radiation selected from the group consisting of visible, ultraviolet, near infrared, mid infrared, far infrared or millimeter wave radiation.

4. An imaging device of claim 3 wherein:
   said electro-magnetic radiation is selected from the group consisting of visible, near infrared and mid infrared radiation.

5. An imaging device of claim 4 wherein:
   said electro-magnetic radiation is selected from the group consisting of visible and near infrared radiation.

6. An imaging device of claim 5 wherein:

said electro-magnetic radiation is visible radiation.

7. An imaging device of claim 1 wherein:
said lens means is an optical lens chosen from the group consisting of wide angle design lens, extra wide angle design lens, normal design lens and telephoto design lens.

8. An imaging device of claim 1 wherein:
said means for moving said camera body and sensor means includes a first axis translational moving means and a second axis translational moving means each independently operatively connected to said sensor means for moving said sensor means, said first axis translational moving means linearly moving said sensor means along a first axis and said second axis translational moving means linearly moving said sensor means along a second axis and wherein said first and said second axes are mutually perpendicular to each other.

9. An imaging device of claim 8 further including:
a third axis means for moving said sensor means linearly along a third axis and wherein said third axis is mutually perpendicular to each of said first and second axes.

10. An imaging device of claim 1 wherein:
said sensor means includes at least one of a visible or infrared focal plane array detector.

11. An imaging device of claim 10 wherein:
said focal plane array detector is selected as one of a linear array detector or a matrix array detector.

12. An optical system of claim 1 wherein:
said means for moving said sensor means including a first axis translational moving means and a second axis translation moving means each independently operatively connected to said sensor means for moving said sensor means, said first axis translational moving means linearly moving said sensor means along a first axis and said second axis translational moving means linearly moving said sensor means along a second axis and wherein said first and said second axes are mutually perpendicular to each other and are mutually perpendicular to the axis of said objective.

13. An optical system of claim 12 wherein:
said first axis translational moving means includes a first axis shuttle, a first axis drive motor and a first axis shuttle guide;
said first axis shuttle guide fixed with respect to said lens;
said first axis shuttle movably mounted on said first axis shuttle guide, said first axis drive motor operatively connected to said first shuttle for moving said first axis shuttle on said first axis shuttle guide,
said second axis translational moving means includes a second axis shuttle, a second axis drive motor and a second axis shuttle guide;
said second axis shuttle guide operatively attached to and moved by said first axis shuttle along said first axis;
said second axis shuttle movably mounted on said second axis shuttle guide, said second axis drive motor operatively connected to said second shuttle for moving said second axis shuttle on said second axis shuttle guide along said second axis; and
said sensor means operatively attached to and moved by said second axis shuttle.

14. An optical system of claim 12 further including:
a third axis means for moving said sensor means linearly along a third axis and wherein said third axis is mutually perpendicular to each of said first and second axes.

15. An imaging device of claim 1 further including:
a radiation intensifier means for amplifying radiation, said radiation intensifier means operatively associated with said lens means and said radiation sensor means and positioned between lens means and said radiation sensor means.

* * * * *